United States Patent
Hogan et al.

(10) Patent No.: US 11,718,698 B2
(45) Date of Patent: Aug. 8, 2023

(54) POLYOLEFIN GRAFTED POLYDIENE POLYMERS, AND METHODS OF MAKING AND USING SAME

(71) Applicant: Bridgestone Corporation, Chuo-ku (JP)

(72) Inventors: Terrence E. Hogan, Uniontown, OH (US); Arif O. Gozen, Dundee, MI (US); James D. Ulmer, Akron, OH (US)

(73) Assignee: Bridgestone Corporation, Chuo-ku (JP)

( * ) Notice: Subject to any disclaimer, the term of this patent is extended or adjusted under 35 U.S.C. 154(b) by 79 days.

(21) Appl. No.: 17/138,015

(22) Filed: Dec. 30, 2020

(65) Prior Publication Data

US 2021/0230420 A1    Jul. 29, 2021

Related U.S. Application Data

(63) Continuation of application No. 16/066,945, filed as application No. PCT/US2016/069072 on Dec. 29, 2016, now abandoned.

(60) Provisional application No. 62/272,121, filed on Dec. 29, 2015.

(51) Int. Cl.
| | |
|---|---|
| C08F 279/02 | (2006.01) |
| C08L 51/04 | (2006.01) |
| C08F 299/00 | (2006.01) |
| C08F 8/34 | (2006.01) |
| C08F 8/32 | (2006.01) |
| C08F 22/06 | (2006.01) |
| C08F 136/06 | (2006.01) |
| C08L 23/32 | (2006.01) |
| C08F 8/46 | (2006.01) |
| C08L 7/00 | (2006.01) |
| C08L 9/00 | (2006.01) |
| B60C 1/00 | (2006.01) |
| C08G 81/00 | (2006.01) |
| C08L 21/00 | (2006.01) |
| C08K 5/372 | (2006.01) |
| C08L 23/08 | (2006.01) |
| C08L 23/14 | (2006.01) |
| C08L 23/02 | (2006.01) |
| C08K 3/013 | (2018.01) |

(52) U.S. Cl.
CPC ............ *C08F 279/02* (2013.01); *B60C 1/00* (2013.01); *B60C 1/0025* (2013.01); *C08F 8/32* (2013.01); *C08F 8/34* (2013.01); *C08F 8/46* (2013.01); *C08F 22/06* (2013.01); *C08F 136/06* (2013.01); *C08F 299/00* (2013.01); *C08G 81/00* (2013.01); *C08K 5/3725* (2013.01); *C08L 7/00* (2013.01); *C08L 9/00* (2013.01); *C08L 21/00* (2013.01); *C08L 23/02* (2013.01); *C08L 23/0815* (2013.01); *C08L 23/14* (2013.01); *C08L 23/32* (2013.01); *C08L 51/04* (2013.01); *C08K 3/013* (2018.01)

(58) Field of Classification Search
CPC ............ C08F 8/34; C08F 8/46; C08F 299/00
See application file for complete search history.

(56) References Cited

U.S. PATENT DOCUMENTS

| | | | |
|---|---|---|---|
| 3,634,218 A | 1/1972 | Gotohda et al. | |
| 3,909,463 A | 9/1975 | Hartman | |
| 3,953,541 A | 4/1976 | Fuji | |
| 4,454,300 A | 6/1984 | Ranade et al. | |
| 4,612,155 A | 9/1986 | Wong et al. | |
| 4,957,968 A | 9/1990 | Adur et al. | |
| 5,424,367 A | 6/1995 | Auda et al. | |
| 5,523,356 A | 6/1996 | Aldrovandi et al. | |
| 5,651,927 A | 7/1997 | Auda et al. | |
| 6,579,949 B1 * | 6/2003 | Hergenrother | C08F 8/42 525/359.1 |
| 6,602,954 B1 | 8/2003 | Lin | |
| 7,166,665 B2 | 1/2007 | Galimberti et al. | |
| 7,230,050 B2 | 6/2007 | Robertson et al. | |
| 3,450,430 A1 | 5/2013 | Silvis et al. | |
| 2005/0228107 A1 | 10/2005 | Lin et al. | |
| 2007/0282034 A1 | 12/2007 | Patel et al. | |
| 2013/0158180 A1 | 6/2013 | Tsou et al. | |
| 2014/0005319 A1 | 2/2014 | Ichikawa | |

(Continued)

FOREIGN PATENT DOCUMENTS

| | | |
|---|---|---|
| CN | 1747977 A | 3/2006 |
| EP | 0955317 A1 | 11/1999 |
| GB | 809838 A | 3/1959 |

(Continued)

OTHER PUBLICATIONS

Hrzayev et al., "Graft Copolymens of Maleic Anhydride and Its Isostructural Analogues: High Performance Engineering Materials", International Review of Chemical Engineering, vol. 3, No. 2, Mar. 2011 (pp. 153-215).

(Continued)

*Primary Examiner* — Jeffrey C Mullis
(74) *Attorney, Agent, or Firm* — Meredith E. Hooker; Stephanie M. Williams

(57) ABSTRACT

Embodiments of the present disclosure are directed to polyolefin grafted polydiene polymers, wherein the polyolefin grafted polydiene polymers comprises a polydiene having a polydiene polymer backbone, a polyolefin, and at least one sulfur containing functionalizing agent which grafts the polyolefin onto at least one non-terminal position on the polydiene polymer backbone.

13 Claims, No Drawings

(56) References Cited

U.S. PATENT DOCUMENTS

2014/0088217 A1* 3/2014 Ng .................. C08L 23/20
522/127

FOREIGN PATENT DOCUMENTS

| | | |
|---|---|---|
| GB | 1105118 A | 3/1968 |
| JP | 2011184511 A | 9/2011 |
| JP | 2012140503 A | 7/2012 |

OTHER PUBLICATIONS

International Search Report and Written Opinion pertaining to PCT/US2016/069072, dated Apr. 14, 2017.
European Search Report pertaining to corresponding European Patent Application No. 16882629.5, dated Sep. 5, 2019.
Chung, T.C. Mike, "Functionalization of Polyolefins," 2002 Academic Press, Chapter 11, p. 209 (2002).
Bhattacharyl, Amit et al., "Polymer Grafting & Crosslinking," Wiley & Sons, 343 pp. (2009).
Llosa Tanco, Margot A. et al., "Preparatio of Porous Chelating Resin Containing Linear Polymer Ligand and the Absorption Characteristics for Hamful Metal losn," Reacitve and Functional Polymers, vol. 53, pp. 91-101 (2011).
Tenhaeff, Wyatt E., "Synthesis of Reactive and Stimuli-Responsive Polymer thin Films by Initiated Chemical Vapor Deposition and Their Sensor Applications," Massachusetts Institute of Technology PhD Thesis (Sep. 2009).
Busfield, W.K., "A Modification of the Properties of Isotactic Polypropylene Film by y-radiation in the Presence of Butadiene", Euro. Poly J., vol. 17, Issue 4, pp. 333-340 (1981).
First Chinese Office Action issued by the Chinese Patent Office for Chinese Patent Application No. 201680075978.1 dated Dec. 26, 2019 (10 pages combined with English Translation).

* cited by examiner

POLYOLEFIN GRAFTED POLYDIENE POLYMERS, AND METHODS OF MAKING AND USING SAME

CROSS-REFERENCE TO RELATED APPLICATIONS

This application is a continuation of U.S. application Ser. No. 16/066,945, filed Jun. 28, 2018, which is a U.S. national stage of PCT Application No. PCT/US16/69072, filed Dec. 29, 2016, which claims priority to U.S. Provisional Application Ser. No. 62/272,121, filed Dec. 29, 2015, which are incorporated by reference herein in their entirety.

TECHNICAL FIELD

Embodiments of the present disclosure are generally related to polyolefin grafted polydiene polymers, and are specifically related to polyolefin grafted polydiene polymers which reduce hysteresis loss and increase ozone cracking resistance when used in rubber compositions.

BACKGROUND

Rubber compositions comprising natural rubber and butadiene rubber (NR/BR) blends are commonly used in tire applications, for example, tire sidewalls. However, it has been found that these blends may contribute to hysteresis loss and ozone cracking. Hysteresis loss is the loss of mechanical energy to heat. Hysteresis loss is often attributed to polymer free ends within the cross-linked rubber network, as well as the disassociation of filler agglomerates.

Ozone cracking results from in-chain unsaturation in the butadiene rubber which is attacked by atmospheric ozone. These attacks may, over time, lead to oxidative degradation, which may subsequently lead to chain cleavage. Anti-ozonants are often added to tire applications (e.g., tire sidewall formulations) to reduce ozone cracking, but anti-ozonants can migrate to the surface and discolor and dull the surface appearance. Further, ethylene-propylene-diene terpolymers (EPDM) have been used to reduce ozone cracking and reduce the amount of anti-ozonant required to minimize ozone cracking. However, the low unsaturation in EPDM compared to NR/BR can lead to inhomogeneous curing, poor tensile properties and poor tear strength.

Accordingly, a continual need exists for improved polydiene polymer compositions that enhance ozone cracking resistance and reduced hysteresis loss in tire and non-tire applications.

SUMMARY

Embodiments of the present disclosure are directed to the grafting of polyolefins onto the backbone of polydiene polymers to provide improved ozone cracking resistance and reduced hysteresis losses in tire applications and non-tire applications, specifically, non-tire applications which would benefit from improved ozone cracking resistance and reduced hysteresis losses.

According to one embodiment, a polyolefin grafted polydiene polymer is provided. The polyolefin grafted polydiene polymer comprises a polydiene having a polydiene polymer backbone, a polyolefin, and at least one sulfur containing functionalizing agent which grafts the polyolefin onto at least one non-terminal position on the polydiene polymer backbone.

According to another embodiment, a rubber composition is provided. The rubber composition comprises one or more rubbers selected from natural rubber and polydiene rubber, reinforcing filler, and the polyolefin grafted polydiene polymer.

According to yet another embodiment, a method of producing a polyolefin grafted polydiene polymer is provided. The method comprises reacting a polyolefin with at least one sulfur containing functionalizing agent to produce a functionalized polyolefin, and producing the polyolefin grafted polydiene polymer by reacting the functionalized polyolefin with an unsaturated polydiene polymer.

Additional features and advantages of the embodiments described herein will be set forth in the detailed description which follows, and in part will be readily apparent to those skilled in the art from that description or recognized by practicing the embodiments described herein, including the detailed description which follows, and the claims.

DETAILED DESCRIPTION

Embodiments of the present disclosure are directed to polyolefin grafted polydiene polymers, and methods of making these polyolefin grafted polydiene polymers. The method includes reacting a polyolefin with at least one sulfur containing functionalizing agent to produce a functionalized polyolefin, and producing the polyolefin grafted polydiene polymer by reacting the functionalized polyolefin with an unsaturated polydiene polymer i.e., an polydiene polymer having at least one double bond.

As used herein, "polydiene polymer" is used to refer to thermoset polymers broadly and encompasses rubbers, elastomers, and other non-vulcanizate thermoset polymers, such as thermoplastic elastomers. As used herein, "composition" refers to the rubber or polydiene polymer component and the additional fillers and additives blended therewith in tire and non-tire applications.

The polydiene polymer encompasses compositions characterized by a glass transition temperature of less than 0° C., in other embodiments less than −10° C., or less than −20° C., or less than −25° C. Alternatively, the polydiene polymer may be characterized by a glass transition temperature of greater than −110° C., or greater than −90° C., or greater than −80° C., and in other embodiments greater than −70° C.

Moreover, the number average molecular weight ($M_n$) of the polydiene polymers can be greater than 10 kg/mol, in other embodiments greater than 50 kg/mol, in other embodiments greater than 80 kg/mol, in other embodiments greater than 100 kg/mol, and in other embodiments greater than 120 kg/mol; the number average molecular weight may be less than 1,000 kg/mol, in other embodiments less than 800 kg/mol, in other embodiments less than 600 kg/mol, and in other embodiments less than 500 kg/mol.

The polydiene polymer may include a homopolymer of one or more conjugated dienes or a copolymer of conjugated dienes. Suitable conjugated dienes include those having from about 4 to about 12 carbon atoms such as 1,3-butadiene, 1,3-cyclohexadiene, isoprene, 1,3-pentadiene, 1,3-hexadiene, 2,3-dimethyl-1,3-butadiene, 2-ethyl-1,3-butadiene, 2-methyl-1,3 pentadiene, 3-methyl-1,3-pentadiene, 4-methyl-1,3-pentadiene, and 2,4-hexadiene. The conjugated dienes may be copolymerized with vinylaromatic compounds to produce copolymers or terpolymers. Suitable vinylaromatic monomers include styrene, alpha-methylstyrene; 1-vinylnaphthalene; 2-vinylnaphthalene; 1-alpha-methylvinylnaphthalene; 2-alphamethyl-vinylnaphthalene; and mixtures of these as well as halo, alkoxy, alkyl, cycloalkyl, aryl, alkaryl and aralkyl derivatives thereof in which the total number of carbon atoms in the combined hydrocarbon is generally not greater than 12. Examples of these latter compounds include: 4-methylstyrene; vinyl toluene; 3,5-diethylstyrene; 2-ethyl-4-benzylstyrene; 4-phenylstyrene; 4-para-tolyl styrene; and 4,5-dimethyl-1-vinylnaphthalene. Occasionally, di- and tri- vinyl aromatic hydrocarbons are used in small amounts in addition with mono-vinyl aromatic hydrocarbons.

In one or more embodiments, the polydiene rubber may include polybutadiene, polyisoprene, natural rubber, polystyrene-co-butadiene, polystyrene-co-isoprene, polystyrene-co-isoprene-co-butadiene rubber. As stated above, while various elastomers are contemplated, the following discussion below will focus on polydiene rubber, specifically polybutadiene.

In exemplary embodiments, the polybutadiene may be 1,4-polybutadiene rubber which may be produced from the polymerization of 1,3-butadiene. Specifically, the 1,4-polybutadiene rubber may be a high-cis 1,4-polybutadiene rubber.

The term "high-cis," as used herein, means a cis-1,4-linkage content of 85% or greater in the resulting polydiene. In certain embodiments, the high-cis polydiene that results from the processes disclosed herein may have a cis-1,4-linkage content of 90% or greater, 92% or greater; 95% or greater; or even 97% or greater. As used herein, "cis %" refers to the percentage of cis 1,4 linkages in the 1,4-polybutadiene.

Various polyolefins are contemplated for grafting onto the polydiene backbone. For example, the polyolefin may comprise one or more homopolymers and copolymers of olefinic monomers. The olefinic monomers may include C2-C12 olefins, or combinations thereof In exemplary embodiments, the polyolefin may comprise polypropylene, polyethylene, or combinations thereof.

In an alternative embodiment, the polyolefin may be an olefin copolymer, for example, an alpha-olefin copolymer. The olefinic monomers comprising the alpha-olefin copolymer may include two or more olefin monomers selected from C2-C12 olefins. For example and not by way of limitation, the C2-C12 olefin monomers may include but are not limited to ethylene, propylene, isobutylene, 1-butene, 1-hexene, 4-methyl-1-pentene, 1-heptene, 1-octene, 1-nonene, and 1-decene. In one copolymer embodiment, the polyolefin copolymer may be produced by an ethylene monomer and at least one other C3-C12 olefin comonomer. For example and not by way of limitation, the C3-C12 olefin comonomer may include but are not limited to propylene, isobutylene, butene, hexene, 4-methyl-1-pentene, heptene, octene, nonene, and decene.

While various molecular weights and molecular weight distributions are contemplated herein, the polyolefin may have a molecular weight distribution (MWD) of about 1 to about 8, about 2 to about 5, or about 2.5 to about 4.5, wherein MWD is defined as Mw/Mn with Mw being the weight average molecular weight and Mn being the number average molecular weight.

Moreover, the polyolefin may be modified with a polymeric modifier. These polymeric modifiers may be attached at various locations on the polyolefin backbone, for example, the terminal ends or at non-terminal positions on the polyolefin backbone. In one embodiment, the polymeric modifier may be an anhydride, for example, a maleic anhydride attached to the polyolefin. Formula 1 below shows an exemplary maleated polyolefin copolymer, wherein variables n and m are integer values being the same or different.

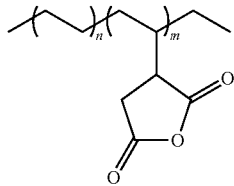

Formula 1

Suitable commercial embodiments of a maleated polyolefin are the TAFMER compositions produced by Mitsui Chemicals, for example, the TAFMER MH5040 maleated ethylene-propylene copolymer, the TAFMER MH7010 maleated ethylene-butene copolymer, and the TAFMER MH7020 maleated ethylene-butene copolymer.

In accordance with the present embodiments, grafting the polyolefin onto the elastomer (e.g., polydiene rubber) provides improved compatibility of the polydiene rubber-polyolefin blend, because the polyolefin is chemically bound to the polydiene rubber. Grafting of the polyolefin to the polydiene rubber may be achieved by reacting a functionalized polyolefin with the polydiene rubber. As used herein, the "functionalized polyolefin" means a polyolefin which reacts with at least one sulfur containing functionalizing agent, and after the reaction, at least one sulfur moiety of the sulfur containing functionalizing agent is available to react with an unsaturated elastomer (e.g., polydiene rubber). As described below, the polyolefin may have been modified with a polymeric modifier (e.g., maleic anhydride) prior to being functionalized with the sulfur containing functionalizing agent. In this case, the sulfur containing functionalizing agent reacts and bonds with the polymeric modifier, but leaves a sulfur moiety available for reaction with the unsaturated elastomer (e.g., polydiene rubber). In alternative embodiments, the polyolefin may not include a polymeric modifier, and thus the sulfur containing functionalizing agent couples to the backbone of the polyolefin, but leaves a sulfur moiety available for reaction with the unsaturated elastomer.

Various methods and sulfur containing functionalizing agents are envisioned by one skilled in the art to provide a functionalized polyolefin. As used herein, the "sulfur containing functionalizing agent" include at least one sulfur containing moiety for reacting with the unsaturated elastomer, and at least one additional reactive moiety for reacting with the polymeric modifier of the polyolefin or the polyolefin backbone, either at a terminal end and/or a non-terminal positions of the polyolefin backbone. For example and not by way of limitation, the sulfur containing functionalizing agent may include thiols, polythiols, aminothiols, polysulfides, and combinations thereof.

The following aminothiol compounds may include but are not limited to cysteamine, glutathione, homocysteine, 3-mercaptopropylamine, 2-mercaptopropylamine, 4-mercaptobutylamine, 3-mercaptobutylamine, 2-mercaptobutylamine, 5-mercaptopentylamine, 4-mercaptopentylamine, 3-mercaptopentylamine, 2-mercaptopentylamine, 6-mercaptohexylamine, 5-mercaptohexylamine, 4-mercaptohexylamine, 3-mercaptohexylamine, 2-mercaptohexylamine and mixtures. The cysteamine embodiment is depicted in Formula 2 below.

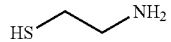

Formula 2

Suitable polysulfides may include an amino disulfide which yields a disulfide functionalized polyolefin. For example and not by way of limitation, the following amino disulfide compounds may include but are not limited to homocysteine disulfide, glutathione disulfide, bis(2-amino-1-propyl)disulfide, bis(3-amino-1-propyl)disulfide, bis(2-aminoethyl)disulfide, bis(4-amino-1-butyl)disulfide, bis(3-amino-1-butyl)disulfide, bis(2-amino-1-butyl)disulfide, bis(5-amino-1-pentyl)disulfide, bis(4-amino-1-pentyl)disulfide, bis(3-amino-1-pentyl)disulfide, bis(2-amino-1-pentyl)disulfide, bis (6-amino-1-hexyl)disulfide, bis(5-amino-1-hexyl)disulfide, bis(4-amino-1-hexyl)disulfide, bis (3-amino-1-hexyl)disulfide, bis(2-amino-1-hexyl)disulfide.

Referring to Formula 3 below, the exemplary sulfur containing functionalizing agent of Formula 2, cysteamine, may functionalize a polyolefin with a maleic anhydride polymeric modifier attached to the polyolefin copolymer. As shown, the polymeric modifier (e.g., maleic anhydride) may react with the cysteamine to produce the functionalized polyolefin shown below in Formula 4. Specifically, the amine group of the cysteamine reacts with the maleic anhydride, but leaves the sulfur moiety available for grafting onto the polydiene rubber as depicted in Formula 5 below. Surprisingly, it was found that the thiol group of the cysteamine greatly improves the grafting efficacy of the polyolefin onto the polybutadiene rubber.

Formula 3

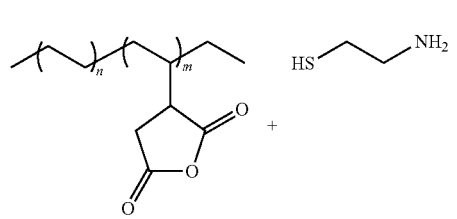

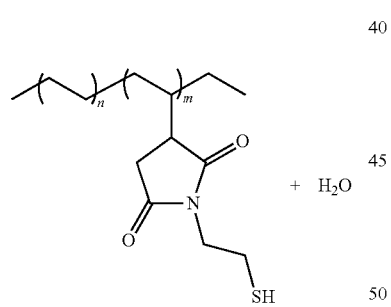

Formula 4

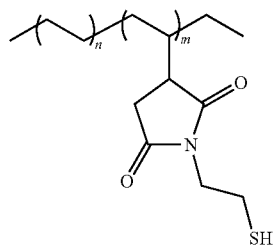

While Formulas 3 and 4 depict the sulfur containing functionalizing agent reacting with the polymeric modifier of the polyolefin to produce a functionalized polyolefin, it is also contemplated to react the sulfur containing functionalizing agent onto the polyolefin backbone to produce the functionalized polyolefin. For example, a dithiol sulfur containing functionalizing agent may attach to the polyolefin backbone to produce the functionalized polyolefin, while allowing an additional thiol group available for reacting with the unsaturated elastomer (e.g., polydiene rubber).

As shown in Formula 5 below, the grafting of the functionalized polyolefin of Formula 4 eliminates at least one of the unsaturated double bonds of the polydiene rubber. As shown, the functionalized polyolefin may be grafted onto at least one non-terminal position on the polydiene polymer backbone. While Formula 5 below depicts only the polyolefin grafted onto the polydiene at one location, it is contemplated that the polyolefin may be attached at multiple locations on the polymeric backbone. In one embodiment, the polyolefin attaches onto multiple random locations along the polymeric backbone of the polydiene rubber. As shown below, the sulfur links the functionalized polyolefin onto the polydiene at a non-terminal position on the polydiene backbone.

Formula 5

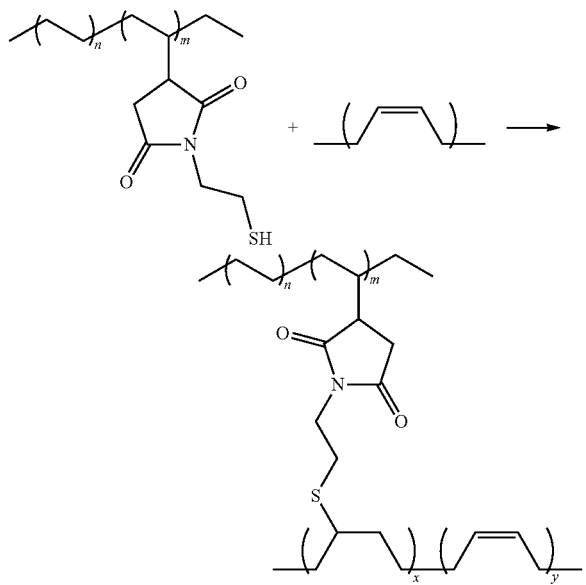

Referring to the exemplary polyolefin grafted polydiene polymer shown below in Formula 6 below, the properties of the polyolefin grafted polydiene polymer may be tailored based on the amount of each component. For example, the polyolefin grafted polydiene polymer comprises from about 10 to about 90% by weight polyolefin (e.g., maleated polyolefin), or about 15% to about 80% by weight polyolefin, or about 20% to about 50% by weight polyolefin, or about 25% to about 40% of the polyolefin. Moreover, the polyolefin grafted polydiene polymer comprises from 10% to about 90% by weight, or about 20% to about 80% by weight polydiene rubber, or about 50% to about 80% by weight polydiene rubber. Said another way, the ratio by weight of polydiene to polyolefin in the polyolefin grafted polydiene polymer is about 20 to about 0.1, 10 to about 0.2, or about 4 to about 1, or about 2 to 1, or about 1 to 1.

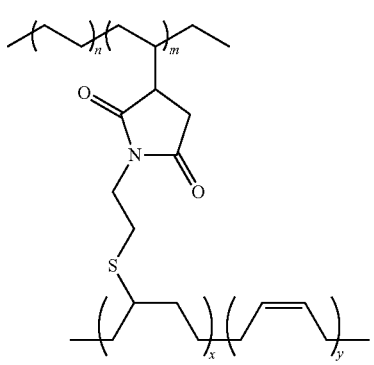

Formula 6

As described in greater detail in the examples below, the functionalized polyolefin may be grafted to the polydiene rubber in a Brabender mixer at conventional rubber mixing temperatures (150-170° C.) and times (2-5 minutes).

Various molecular weights are possible for the polyolefin grafted polydiene. In one embodiment, the polyolefin grafted polydiene may have a molecular weight distribution (MWD) of about 1 to about 15, or about 2 to about 10, or about 2.5 to about 5, or about 2.5 to about 4, or about 3 to about 4, wherein MWD is defined as Mw/Mn with Mw being the weight average molecular weight and Mn being the number average molecular weight. In further embodiments, the polyolefin grafted polydiene may have a weight average molecular weight of less than 800 kg/mol, or less than 500 kg/mol, or less than 400 kg/mol.

As stated above, the polyolefin grafted polydiene polymer may be incorporated into a tire application, for example, tire sidewalls. The tire sidewall compositions may include natural rubber, polybutadiene rubber, fillers (also called reinforcing fillers), and the polyolefin grafted polydiene polymer (e.g., a maleated polyolefin grafted polydiene polymer).

The fillers that can be employed include those fillers that are conventionally employed in the manufacture of tires. Useful reinforcing fillers include inorganic and organic fillers. The organic fillers include carbon black and starch. The inorganic fillers may include silica, aluminum hydroxide, magnesium hydroxide, clays (hydrated aluminum silicates), and mixtures thereof. In one embodiment, the reinforcing filler include carbon black.

In addition or as an alternative to the NR/BR blend, other rubbery elastomers may include synthetic polyisoprene, polyisobutylene-co-isoprene, neoprene, poly(ethylene-co-propylene), poly(styrene-co-butadiene), poly(styrene-co-isoprene), and poly(styrene-co-isoprene-co-butadiene), poly(isoprene-co-butadiene), poly(ethylene-co-propylene-co-diene), polysulfide rubber, acrylic rubber, urethane rubber, silicone rubber, epichlorohydrin rubber, and mixtures thereof.

Useful processing or extender oils may also be included. Preferred oils include those that are commercially available as paraffinic, aromatic, or naphthenic oils. In one or more embodiments, the major constituent of the oil is naphthenic. The tire components may also include other additives such as anti-ozonants, waxes, scorch inhibiting agents, processing aids, zinc oxide, tackifying resins, reinforcing resins, fatty acids such as stearic acid, peptizers, and one or accelerators.

The anti-ozonants may comprise N,N'disubstituted-p-phenylenediamines, such as N-1,3-dimethylbutyl-N'phenyl-p-phenylenediamine (6PPD), N,N'-Bis(1,4-dimethylpently)-p-phenylenediamine, N-phenyl-N-isopropyl-p-phenylenediamine, and N-phenyl-N'-(1,3-dimethylbutyl)-p-phenylenediamine. Other examples of anti-ozonants include, Acetone diphenylamine condensation product (Alchem BL), 2,4-Trimethyl-1,2-dihydroquinoline (TMQ), Octylated Diphenylamine, and 2,6-di-t-butyl-4-methyl phenol.

The curing accelerators may include, but are not limited to, dithiocarbamate accelerators, including the metal dialkyldithiocarbamates such as, for example, zinc dibutyldithiocarbamate, zinc diethyldithiocarbamate, zinc dimethyldithiocarbamate, and ferric dimethyldithiocarbamate; thiazole accelerators including 2-mercaptobenzothiazole, the benzothiazole disulfides such as, for example, mercaptobenzothiazole disulfide; the benzothiazole sulfenamides, such as, for example, n-cyclohexyl-2-benzothiazole sulfenamide; and sulfenamide accelerators such as, for example, t-butyl-2-benzothiazyl sulfenamide (TBBS).

The tire components may include at least 3 parts by weight filler per 1000 parts rubber (phr), or about 5 to about 1000 phr, or about 20 to about 80 phr, or about 30 to about 50 phr. The tire components may also include from about 0 to about 80 parts processing or extender oil per 100 parts by weight rubber, or from about 5 to about 50 phr, or from about 10 to about 30 phr.

The present polyolefin grafted polydiene polymer compounds may be used as a partial or full replacement for the polybutadiene rubber (BR) in the NR/BR blend or as a supplemental component for the NR/BR blend. As stated above, the double bond of the BR makes it susceptible to ozone cracking due to atmospheric ozone exposure. Thus, replacing a portion of the BR in the NR/BR blend with the polyolefin grafted polydiene polymer or adding polyolefin grafted polydiene polymer to the NR/BR blend will increase ozone cracking resistance for the NR/BR blend and the tire formulation as a whole.

Of the total hundred parts rubber, the polyolefin grafted polydiene polymer may include from about 20 to about 80 parts of the 100 total, or about 25 to about 75 parts of the 100 total, 30 to about 60 parts of the 100 total. Said another way, the rubber composition may include from about 0 to about 40 phr NR, about 0 to about 50 phr BR, and about 10 to about 60 polyolefin grafted polydiene polymer.

Moreover, the present polyolefin grafted polydiene polymer compounds may be used as a partial or replacement for the reinforcing filler and/or a supplemental component for the NR/BR blend. When added to the other components, the polyolefin grafted polydiene polymer compound may have hard particulates. As a result of these hard particulates, the polyolefin grafted polydiene polymer may replace a portion of the reinforcing filler, for example, carbon black. Surprisingly, hysteresis loss reduction was obtained by replacing the carbon black with the polyolefin grafted polydiene polymer, while simultaneously improving the ozone cracking resistance. In one or more embodiments, the volume fraction of reinforcing filler plus polyolefin in the composition is about 0.200 to about 0.350, about 0.200 to about 0.300, or about 0.250 to about 0.300. The effective filler volume fraction of carbon black, V, may be calculated as $V=\phi\{0.5(1+[1+0.02139(DBPA)]/1.46)\}$, as described in A. I. Medalia, "Rubber Chem. Melina", 46, 877 (1973), where $\phi$ is the carbon black volume fraction in the final mix, and DBPA is dibutyl pthalate absorption number in cc/100 g, as per ASTM D2414-86.

Moreover, the hysteresis loss reduction of the polyolefin grafted polydiene polymer may be characterized one or more of the following metrics. One such metric is the loss modulus of the polyolefin grafted polydiene rubber, wherein lower G" values indicate hysteresis loss reduction. In one or more embodiments, the loss modulus G" may be less than or equal to about 0.1 MPa, or less than or equal to about 0.08 MPa.

The tan δ is another metric that characterizes hysteresis loss reduction. Tan δ is expressed by a ratio of the measurement of energy lost as heat (loss modulus) G" versus the energy stored and released (storage modulus) G'. This ratio represents the mechanical loss angle. The mechanical loss angle is expressed as G"/G', and lower tan δ values indicate lower hysteresis loss. In one or more embodiments, the tan δ is less than or equal to about 0.075.

While the above describes the use of the rubber compositions in tire sidewalls, the rubber compositions of the present disclosure may be utilized in various other components or articles, which utilize such rubber compositions. Typical articles may include, but are not limited to, innertubes and tire inner liners, air cushions, pneumatic sprays, air bags, tire-curing bladders, high temperature hoses and conveyor belts, damping mounts for engines and the like, tire treads, tire subtreads, and tire bead filler.

EXAMPLES

The following are exemplary synthesis methods for producing polyolefin grafted polydiene polymers. Experimental Process A illustrates the grafting of polyethylene homopolymers onto polydiene rubber, whereas Experimental Processes B and C illustrate the grafting of polyethylene copolymers onto polydiene rubber.

Experimental Process A—Grafting of Polyethylene Homopolymers onto Polydiene Rubber To a 50g Brabender mixer with cam rotors operating at 60 RPM, 45 g of maleic anhydride grafted polyethylene, Eastman G-2608 (3.2 mmol maleic anhydride calculated from acid number) was added at 125° C. After one minute, 0.694 g (9 mmol) of cysteamine was added. After 2.5 minutes, the contents were discharged from the Brabender at 171° C.

To a 50 g Brabender with cam rotors operating at 60 RPM, 36 g of high cis polybutadiene (97% cis) was added at 125° C. After thirty seconds, 9 g of the above cysteamine functionalized Eastman G-2608 maleated polyethylene was added. After 2.5 minutes, the product, which is Example 1 of Table 1, were discharged from the Brabender at 171° C.

To a 50 g Brabender with cam rotors operating at 60 RPM, 36 g of high cis polybutadiene (97% cis) was added at 125° C. After thirty seconds, 9 g of maleic anhydride grafted polypropylene was added. After 2.5 minutes, the contents, which are the Comparative Example of Table 1, were discharged from the Brabender at 157° C.

TABLE 1

Comparison of polyolefin grafted polybutadiene polymers produced with and without thiol functionalization

|  | Example 1 (Thiol Functionalized Polyolefin) | Comparative Example (No Thiol Functionalization) |
| --- | --- | --- |
| $M_n$ (kg/mol) | 102.6 | 83.5 |
| $M_w$ (kg/mol) | 375.6 | 300.7 |
| Mw/Mn | 3.66 | 3.60 |

The molecular weight ($M_n$ and $M_w$) and molecular weight distribution ($M_w/M_n$) was determined by Gel Permeation Chromatography (GPC). As shown, Example 1 depicts a grafted rubber having a much greater $M_w$ and $M_n$ than the Comparative Example, which does not use the cysteamine thiol to graft the polyethylene onto the polybutadiene. Comparing Example 1 to the Comparative Example, the greater $M_w$ and $M_n$ values indicate that the use of the cysteamine thiol as in Example 1 greatly improves the grafting efficiency of the polyethylene onto the backbone of the polydiene rubber.

Experimental Process B—Grafting of Polyethylene Copolymers onto Polydiene Rubber TAFMER ethylene-butene copolymer from Mitsui Chemical was grafted onto a high-cis polybutadiene rubber from Firestone Polymers, having approximately 97%, rubber with a glass transition ($T_g$) of nominally −109° C. and a Mooney viscosity, $ML_{1+4}$ at 100° C., of about 40. The grafting reaction was completed in a Brabender mixer between 125-175° C. in two steps. For compounding, a rubber blend with NR (35 phr)/BR (65 phr)/Carbon Black (CB) (60 phr) was used as the control.

Table 2 sets forth the data obtained from various mechanical and dynamic tests performed. As shown below in Table 2, the TAFMER/high-cis BR polyolefin grafted polybutadiene demonstrates improved tensile properties at 23° C. and 100° as indicated by the tensile strength ($T_b$) and elongation ($E_b$) data below.

TABLE 2

Comparative data for NR/BR conventional formulation versus TAFMER/high-cis BR formulation

| Properties | NR/BR control | TAFMER/ high-cis BR |
| --- | --- | --- |
| ts5% [160° C. Cure] (min): | 2.37 | 2.31 |
| t90% [160° C. Cure] (min): | 4.18 | 3.86 |
| $ML_{1+4}$@ 130° C.: | 37.8 | 43.9 |
| Bound rubber (%) | 18.1 | 28.2 |
| G' [TS, 0° C., 10 Hz, 1%] (MPa): | 4.64 | 10.20 |
| Tan δ [TS, 0° C., 10 Hz, 1%]: | 0.181 | 0.198 |
| G' [TS, 50° C., 10 Hz, 1%] (MPa): | 3.49 | 6.15 |
| Tan δ [TS, 50° C., 10 Hz, 1%]: | 0.126 | 0.131 |
| 50% Modulus @ 23° C. (MPa): | 0.92 | 1.57 |
| 200% Modulus @ 23° C. (MPa): | 3.76 | 5.80 |
| $T_b*E_b$ (23° C.) | 6721 | 7050 |
| 50% Modulus @ 100° C. (MPa): | 0.94 | 1.29 |
| 200% Modulus @ 100° C. (MPa): | 3.61 | 4.38 |
| $T_b*E_b$ (100° C.) | 3148 | 4346 |

Modulus (50% and 200%), $T_b$ and $E_b$ were calculated according to the calculations set forth in ASTM D412 (1998). Dynamic properties were determined by using a Rheometrics Dynamic Analyzer (RDA). Tan δ was obtained from temperature sweep experiments conducted with a frequency of 31.4 rad/sec using 1% strain for temperatures ranging from 0° C. to 50° C. Strain sweep experiments on an RPA 2000 Rubber Process Analyzer (Alpha Technologies) were used to obtain ΔG' data, at a frequency of 10 Hz at temperatures from 0-50° C.

The Mooney viscosity measurements were taken at 130° C. The sample was preheated for 1 minute, a large rotor was started, and the torque was measured after 4 minutes of rotation. $T_{S5}$ is the time required for the torque to reach 5% of the total torque increase during the curing process. $T_{90}$ is the time required for the torque to reach 90% of the total torque increase during the curing process.

In addition to the above quantitative analysis, a qualitative ozone test was conducted. Specifically, torsion strip samples of the cured rubber were exposed to ozone at room temperature to determine the ozone cracking resistance performance of the grafted TAFMER ethylene-butene rubber onto the high-cis BR. After testing, the control samples of NR/BR blend broke on/before day 7 of ozone exposure; however, the TAFMER/high-cis BR samples remained intact.

Experimental Process C—Further Testing of Polyethylene Copolymers Grafted onto Polydiene Rubber This process also involved the grafting of TAFMER MH7020 onto the high-cis polybutadiene rubber of Experimental Process C. The TAFMER MH7020, which reacted with the cysteamine, was grafted to the high-cis polybutadiene rubber in a 1/1 weight ratio.

To a 300 g Brabender operating at a starting rotor speed of 45 RPM, 270 g of maleic TAFMER MH7020 and was added at 126° C. After 30 seconds, 0.31 g of cysteamine was added. At 1 minute, rotor was reduced to 30 RPM, and at 4 minutes, the MH7020-cysteamine product was discharged from the Brabender at 170° C.

To a 300 g Brabender operating at a starting rotor speed of 45 RPM, 125 g of MH7020-cysteamine and 125 g of high-cis BR were added at 126° C. After 10 minutes, a product batch 1 of MH7020-cysteamine grafted high-cis BR rubber was discharged from the Brabender at 162° C. A product batch 2 was produced using the same process and then both batches were blended with a 6×12" mill at a 60° C. roll temperature into a final MH7020-cysteamine grafted high-cis polybutadiene rubber (referred to below as "PO-g-BR").

As shown in Table 3 below, the PO-g-BR was compounded in the formulations of Table 3 below. Two levels of PO-g-BR were evaluated in comparison to the NR/BR blend (Comparative Example 1), and in comparison of the two NR/BR/EPDM blends (Comparative Examples 2 and 4). As compared to Comparative Example 1, Examples 3 and 5 add PO-g-BR without adjusting the carbon black filler amount, whereas the polyolefin (PO) component of PO-g-BR replaces a portion of the carbon black to maintain an effective filler volume fraction of PO plus carbon black.

That is, with the addition of PO-g-BR, carbon black was removed from the formula so that the total effective filler volume fraction, carbon black plus the PO component of the PO-g-BR, was very nearly the same as the carbon black effective filler volume fraction in the NR/BR formula and in the two NR/BR/EPDM formulas. Table 3—Rubber composition Examples with and without PO-g-BR

|  | Comp. Ex. 1 (NR/BR only) | Comp. Ex. 2 (30 phr EPDM) | Comp. Ex. 3 (30 phr PO-g-BD) | Comp. Ex. 4 (15 phr EPDM) | Ex. 5 (15 phr PO-g-BD) | Ex. 6 (30 phr PO-g-BD & CB reduced) | Ex. 7 (15 phr PO-g-BD & CB reduced) |
|---|---|---|---|---|---|---|---|
| Natural Rubber/Butadiene Rubber | | | | | | | |
| Natural Rubber | 35 | 35 | 35 | 35 | 35 | 35 | 35 |
| Hi-cis Butadiene Rubber | 65 | 35 | 5 | 50 | 35 | 5 | 35 |
| Polyolefin grafted Polybutadiene | | | | | | | |
| Total PO-g-BD | 0 | 0 | 60 | 0 | 30 | 60 | 30 |
| Anti-ozonant | | | | | | | |
| EPDM | 0 | 30 | 0 | 15 | 0 | 0 | 0 |
| PO Amount in EPDM and PO-g-BD | | | | | | | |
| Total PO component | 0 | 30 | 30 | 15 | 15 | 30 | 15 |
| Carbon Black | 45 | 45 | 45 | 45 | 45 | 24.9 | 24.9 |
| Total PO + CB filler volume fraction | 0.283 | 0.280 | 0.495 | 0.282 | 0.388 | 0.280 | 0.282 |
| Mechanical Properties | | | | | | | |
| G" (10%, 24° C., 0.5 Hz) | 0.1268 | 0.2240 | 0.185 | 0.1660 | 0.160 | 0.0389 | 0.0712 |
| Tan δ (10%, 24° C., 0.5 Hz) | 0.0875 | 0.1236 | 0.0805 | 0.1085 | 0.0898 | 0.0405 | 0.0604 |
| G" (10%, 60° C., 10 Hz) | 0.1393 | 0.2100 | 0.176 | 0.1761 | 0.161 | 0.0542 | 0.0867 |
| Tan δ (10%, 60° C., 10 Hz) | 0.0865 | 0.1134 | 0.094 | 0.1056 | 0.095 | 0.0669 | 0.0746 |

In addition to the masterbatch ingredients above, all of the rubber compositions also include the following masterbatch ingredients: 2.5 phr ZnO; 1.0 phr stearic acid; 10 phr naphthenic oil; 2.0 phr 6PPD; and 1.0 phr TMQ. The same final mixing batch ingredients were used in each of the compounds and they are: 2.0 phr 20% oil extended sulfur; and 0.7 phr TBBS.

Table 4 below provides results of ozone experiments with the above referenced examples in Table 3 when exposed to ozone. Specifically, torsion strips of the Table 3 examples were exposed to 50 pphm ozone for up to 10 days at 12.5% static strain.

TABLE 4

Static Strain Ozone Test Results

| Examples | Condition of Strips on Day 5 | Condition of Strips on Day 10 |
|---|---|---|
| Comparative Example 1 (NR/BR only) | Extensive surface cracks and edge cracks | Broken specimen |
| Comparative Example 2 (30 phr EPDM) | No apparent cracks | No apparent cracks |
| Ex. 3 (30 phr PO-g-BD) | No apparent cracks | No apparent cracks |
| Comparative Example 4 (15 phr EPDM) | One vertical crack | Large edge cracks |
| Ex. 5 (15 phr PO-g-BD) | Surface cracks and edge cracks | Broken |
| Ex. 6 (30 phr PO-g-BD & CB reduced) | No apparent cracks | No apparent cracks |
| Ex. 7 (15 phr PO-g-BD & CB reduced) | Over vertical crack | Moderate edge crack |

Referring to Tables 3 and 4, when carbon black loading was reduced to 24.9 phr to maintain the same total filler volume fraction (Example 7), the compound ozone specimen did not break for up to 10 days on test at 12.5% static strain, while the NR/BR compound (Comparative Example 1) broke completely through at 10 days or earlier on test at the same 12.5% strain condition. In addition, Example 7 was at least qualitatively equal in ozone cracking resistance at 12.5% strain and 10 days on test than the 15 phr EPDM example (Comparative Example 4). Surprisingly, replacement of carbon black by PO at 15 phr PO (Example 7) demonstrated an ozone cracking resistance improvement over 15 phr PO without carbon black replacement (Example 5), since Example 7 had not broken after 10 days on test, while Example 5 had broken.

Overall, the use of 15 phr PO in an NR/BR/PO-g-BR formula coupled with a reduction in carbon black loading (Example 7) provided improved ozone cracking resistance compared to a compound also containing 15 phr of PO in an NR/BR/PO-g-BR formula, but without the concomitant reduction in carbon black loading (Example 5). In this comparison, carbon black loading was reduced so that the total of PO volume fraction plus effective carbon black volume fraction was the same as the effective carbon black volume fraction, where no compensation for PO volume fraction was made.

In addition to ozone cracking resistance, Table 3 above also above provides data which shows a large reduction in hysteresis loss as gauged by either tan δ or G". For example, at 24° C., the tan δ of Example 6, which contains 30 phr of polyolefin (PO) and 24.9 phr of carbon black, is 50% lower than its counterpart, Example 3, which contains 30 phr of PO and 45 phr of carbon black. In addition at 24° C., the G" of Example 6 is 80% lower than Example 3. At 60° C., the tan δ and G" reductions of Example 6 vs. Example 3 are 29% and 69%, respectively.

Moreover, at 24° C., tan δ of Example 7, which contains 15 phr of PO and 24.9 phr of carbon black, is 33% lower than its counterpart, Example 5, which contains 15 phr of PO and 45 phr of carbon black. In addition, at 24° C., the G" of Example 7 is 56% lower than Example 5. At 60° C., the tan δ and G" reductions of Example 7 vs. Example 5 are 21% and 46%, respectively.

When the PO component of PO-g-BR compounds was compared at the same phr to EPDM compounds at the same filler volume fraction, there was also a hysteresis advantage. For example at 24° C., the tan δ of Example 6, which contains 30 phr of PO and 24.9 phr of carbon black, is 67% lower than its EPDM counterpart, Comparative Example 2, which contains 30 phr of EPDM and 45 phr of carbon black. In addition at 24° C., the G" of Example 6 is 83% lower than Comparative Example 2. At 60° C., the tan δ and G" reductions of Example 6 vs. Comparative Example 2 are 41% and 74%, respectively.

Further at 24° C., the tan δ of Example 7, which contains 15 phr of PO and 24.9 phr of carbon black, is 44% lower than its EPDM counterpart, Comparative Example 4, which contains 15 phr of EPDM and 45 phr of carbon black. In addition at 24° C., the G" of Example 7 is 57% lower than Example 4. At 60° C., the tan δ and G" reductions of Example 7 vs. Comparative Example 4 are 29% and 51%, respectively.

Accordingly, the filler volume fraction matching method also reduces hysteresis loss in NR/BR formulas while simultaneously generally improving ozone cracking resistance over NR/BR (Comparative Example 1), especially with 30 phr of PO in the formula. For example at 24° C., tan δ of Examples 6 and 7, containing 30 phr of PO and 4.9 phr of carbon black, and containing 15 phr of PO and 24.9 phr of carbon black, respectively, are 54% and 31% lower, respectively, than Comparative Example 1, which comprises NR/BR and 45 phr of carbon black with no PO. In addition at 24° C., the G" of Examples 6 and 7 are 69% and 44% lower, respectively, than Comparative Example 1. At 60° C., the tan δ reductions of Examples 6 and 7 vs. Comparative Example 1 are 22% and 13%, respectively. At 60° C., the G" reductions of Examples 6 and 7 vs. Comparative Example 1 are 61% and 37%, respectively.

Without being bound by theory, if the filler volume fraction is not matched, then the improvement in ozone cracking resistance of NR/BR/PO-g-BR compared to NR/BR may be accompanied by the disadvantage of increased hysteresis loss. Surprisingly, reducing the carbon black loading yields the combination of improved ozone cracking resistance and hysteresis loss reduction by matching the sum of PO volume fraction plus carbon black effective volume fraction with the effective volume fraction of carbon black in compounds comprising NR/BR and NR/BR/PO-g-BR. And in comparison to NR/BR/EPDM, the hysteresis loss reduction is achieved while improving ozone cracking resistance.

Surprisingly, PO-g-BR provides lower rubber hysteresis loss, as gauged by G" and tan δ than EPDM, when EPDM is compared to PO-g-BR at the same PO loadings of either 15 or 30 phr PO. For example, G" at 24° C. of formulas containing PO-g-BR are lower than formulas containing EPDM at loadings equal to PO by 17% and 4% at 15 phr and 30 phr, respectively. In addition, tan δ at 24° C. of formulas containing PO-g-BR are lower than formulas containing EPDM at loadings equal to PO by 35% and 17% at 15 phr and 30 phr, respectively.

At 60° C., G″ of formulas containing PO-g-BR are lower than formulas containing EPDM at loadings equal to PO by 16% and 9% at 15 phr and 30 phr, respectively, while at 60° C., tan δ is lower by 17% and 10%, respectively.

A first aspect of the present disclosure may be directed to a polyolefin grafted polydiene polymer comprising a polydiene having a polydiene polymer backbone; a polyolefin; and at least one sulfur containing functionalizing agent which grafts the polyolefin onto at least one non- terminal position on the polydiene polymer backbone.

A second aspect of the present disclosure may include the first aspect, wherein the polyolefin comprises an anhydride polymeric modifier.

A third aspect of the present disclosure may include the first and second aspects, wherein the anhydride polymeric modifier comprises maleic anhydride.

A fourth aspect of the present disclosure may include any of the first through third aspects, wherein the sulfur containing functionalizing agent comprises an aminothiol, the aminothiol having an amine moiety which reacts with the anhydride polymeric modifier.

A fifth aspect of the present disclosure may include any of the first through fourth aspects, wherein the polyolefin comprises one or more $C_2$-$C_{12}$ olefins.

A sixth aspect of the present disclosure may include any of the first through fifth aspects, wherein the polyolefin is a copolymer, wherein the copolymer includes an ethylene monomer and at least one $C_3$-$C_{12}$ olefin comonomer.

A seventh aspect of the present disclosure may include any of the first through sixth aspects, wherein the polydiene rubber is 1,4-polybutadiene rubber having a cis % of at least 85%.

An eighth aspect of the present disclosure may be directed to a rubber composition comprising one or more rubbers selected from natural rubber and polydiene rubber, reinforcing filler, and the polyolefin grafted polydiene polymers of any of the first through seventh aspects.

A ninth aspect of the present disclosure may include the elements of the eighth aspect, wherein a volume fraction of reinforcing filler plus polyolefin in the rubber composition is about 0.200 to about 0.350.

A tenth aspect of the present disclosure may include the elements of the eighth or ninth aspects, wherein the rubber composition has a loss modulus G″≤0.1 MPa and a tan δ≤0.075.

An eleventh aspect of the present disclosure may be directed to a method of producing a polyolefin grafted polydiene polymer comprising: reacting a polyolefin with at least one sulfur containing functionalizing agent to produce a functionalized polyolefin; and producing the polyolefin grafted polydiene polymer by reacting the functionalized polyolefin with an unsaturated polydiene polymer.

A twelfth aspect of the present disclosure may include the eleventh aspect, wherein the unsaturated polydiene polymer is 1,4-polybutadiene rubber having a cis % of at least 85%.

A thirteenth aspect of the present disclosure may include any of the eleventh and twelfth aspects, wherein the polyolefin comprises a polyolefin polymer backbone with a polymeric modifier attached thereto, wherein the polymeric modifier reacts with the sulfur containing functionalizing agent.

A fourteenth aspect of the present disclosure may include any of the eleventh through thirteenth aspects, wherein the polymeric modifier is maleic anhydride.

A fifteenth aspect of the present disclosure may include any of the eleventh through fourteenth aspects, wherein the sulfur containing functionalizing agent includes thiols, polysulfides, or combinations thereof.

A sixteenth aspect of the present disclosure may include any of the eleventh through fifteenth aspects, wherein the sulfur containing functionalizing agent is an aminothiol.

A seventeenth aspect of the present disclosure may include any of the eleventh through sixteenth aspects, wherein the functionalized polyolefin is grafted onto at least one non-terminal position on the unsaturated polydiene polymer.

An eighteenth aspect of the present disclosure may include any of the eleventh through seventeenth aspects, wherein the polydiene rubber is 1,4-polybutadiene rubber having a cis % of at least 85%.

A nineteenth aspect of the present disclosure may include any of the eleventh through eighteenth aspects, wherein the polyolefin comprises one or more $C_2$-$C_{12}$ olefins.

A twentieth aspect of the present disclosure may include any of the eleventh through nineteenth aspects, wherein the polyolefin is a copolymer, wherein the copolymer includes an ethylene monomer and at least one $C_3$-$C_{12}$ olefin comonomer.

It will be apparent that modifications and variations are possible without departing from the scope of the disclosure defined in the appended claims. More specifically, although some aspects of the present disclosure are identified herein as preferred or particularly advantageous, it is contemplated that the present disclosure is not necessarily limited to these aspects.

The invention claimed is:
1. A polyolefin grafted polydiene polymer comprising:
   a polydiene having a polydiene polymer backbone;
   a polyolefin having an anhydride polymeric modifier; and
   at least one sulfur containing functionalizing agent which grafts the polyolefin onto at least one non-terminal position on the polydiene polymer backbone.
2. The polyolefin grafted polydiene polymer of claim 1, wherein the anhydride polymeric modifier comprises maleic anhydride.
3. The polyolefin grafted polydiene polymer of claim 1, wherein the sulfur containing functionalizing agent comprises an aminothiol, the aminothiol having an amine moiety which reacts with the anhydride polymeric modifier.
4. The polyolefin grafted polydiene polymer of claim 1, wherein the polyolefin comprises one or more $C_2$-$C_{12}$ olefins.
5. The polyolefin grafted polydiene polymer of claim 1, wherein the polydiene comprises 1,4-polybutadiene having a cis % of at least 85%.
6. A rubber composition comprising:
   one or more rubbers selected from natural rubber and polydiene rubber;
   reinforcing filler; and
   the polyolefin grafted polydiene polymer of claim 1.
7. The rubber composition of claim 6, wherein a volume fraction of reinforcing filler plus polyolefin in the rubber composition is about 0.200 to about 0.350.
8. A method of producing a polyolefin grafted polydiene polymer comprising:
   reacting a polyolefin having an anhydride polymeric modifier with at least one sulfur containing functionalizing agent to produce a functionalized polyolefin; and producing the polyolefin grafted polydiene polymer by reacting the functionalized polyolefin with an unsaturated polydiene polymer.

9. The method of claim 8, wherein the unsaturated polydiene polymer comprises 1,4-polybutadiene having a cis % of at least 85%.

10. The method of claim 8, wherein the polymeric modifier reacts with the sulfur containing functionalizing agent.

11. The method of claim 8, wherein the polymeric modifier is maleic anhydride, and the sulfur containing functionalizing agent includes thiols, polysulfides, or combinations thereof.

12. The method of claim 8, wherein the functionalized polyolefin is grafted onto at least one non-terminal position on the unsaturated polydiene polymer.

13. The method of claim 8, wherein the polyolefin is a copolymer, wherein the copolymer includes an ethylene monomer and at least one $C_3$-$C_{12}$ olefin comonomer.

* * * * *